May 26, 1931.　　　E. E. DORAN　　　1,807,201
WHEELED SCRAPER
Filed Jan. 27, 1930　　2 Sheets-Sheet 1
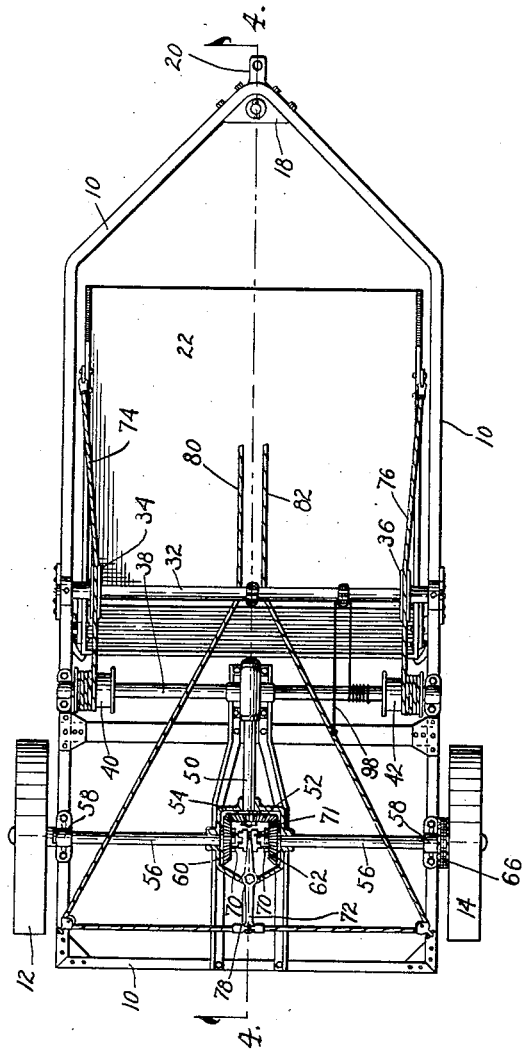
Witness
Ralph Collins
Inventor
Elmer E. Doran.
by Bair, Freeman & Sinclair
Attorneys Patented May 26, 1931

1,807,201

UNITED STATES PATENT OFFICE

ELMER E. DORAN, OF MERCED, CALIFORNIA

WHEELED SCRAPER

Application filed January 27, 1930. Serial No. 423,683.

The object of this invention is to provide an improved construction for an earth excavating and conveying scraper mounted on a wheeled frame adapted to be drawn by a tractor or the like, the movement of the scraper pan being governed by suitable clutch controlled gearing operable from one of the ground wheels of the device and the clutch mechanism being provided with suitable controls extended to the tractor whereby the scraper mechanism may be under the control of the operator of the tractor, thus eliminating the necessity of having an additional operator on the wheeled scraper.

A further object of the invention is to provide a wheeled scraper, so constructed as to be efficient in use and yet so simple in construction and operation that it may be controlled effectively by the driver of a tractor which is employed for pulling the machine.

A further object of the invention is to provide improved clutch controlled gearing mechanism for raising and lowering a scraper pivotally mounted on a wheeled frame.

Another object of the invention is to provide an improved wheeled scraper in which the scraper pan is pivotally mounted so that its rear end is always carried at a slightly elevated position and in such manner that said rear end will be raised and moved quickly away from the ground surface after the lifting operation commences.

Still another object of the invention is to provide an improved scraper pan having a rear gate hinged at its upper margin and provided with an adjustable stop means, whereby the discharge of earth from the bucket may be controlled for the purpose of dumping the contents all in one place, or of spreading the contents as the machine advances.

An additional object is to provide cushioned means for automatically closing the hinged rear gate of the scraper as the latter member is lowered to position for filling.

Another object is to provide means for automatically releasing the hinged rear gate when the lifting of the scraper has reached a certain point.

A further object is to provide an improved release means for automatically throwing the lifting mechanism out of gear when the scraper has reached a certain point of elevation.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of a wheeled scraper embodying my improvements.

Figure 2 is a side elevation of the same.

Figure 6 is a horizontal section through the rear portion of the scraper pan illustrating the cam means for automatically releasing a spring latch which holds the hinged rear gate in closed position.

Figure 3:
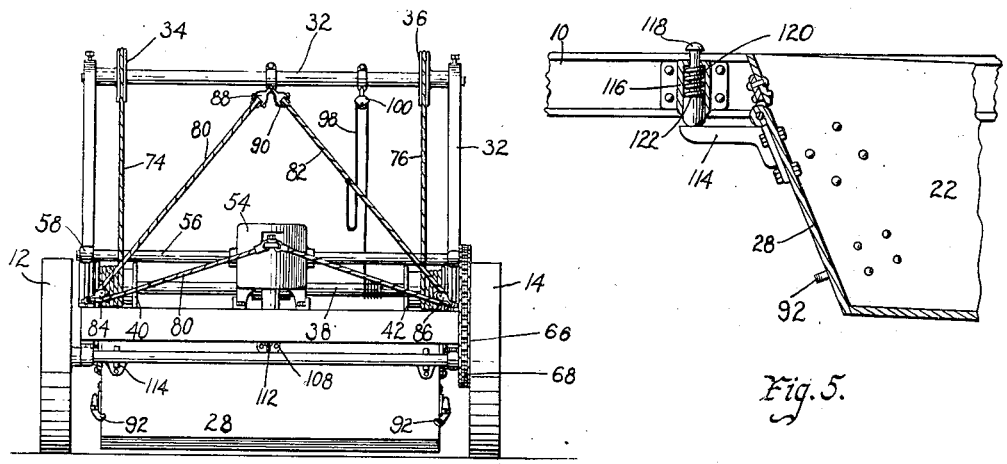
Figure 3 is a rear elevation of the machine.

My improved wheeled scraper includes a main frame 10 arranged in horizontal position and supported by rear wheels 12 and 14, and by a caster wheel 16 at its forward end. The side walls of the frame 10 preferably converge at their forward ends as shown in Figure 1 and at the forward point is located a bearing member 18 for the stem of the caster wheel. This bearing means may also include a forwardly extending hitch lug 20 by means of which the wheeled frame may be pivotally attached in trailing relation to a tractor or the like.

A scraper pan or bucket 22, which is open at its forward end, is mounted between the side bars of the frame 10 and is pivotally mounted for vertical movement on trunnions 24 fixed to the side walls of the pan and journaled in bearings 26 suspended from the side members of the frame. The rear end of the scraper pan 22 is normally closed by a gate 28 hinged at its upper margin at 30 to the pan.

An upright frame 32 is carried by the main frame 10 at a point near the pivotal mounting of the scraper pan 22 and said upright frame carries a pair of direction pulleys designated by the numerals 34 and 36.

A drum shaft 38 is journaled on the main frame 10 rearwardly of the upright frame 32 and drums 40 and 42 are fixed to said shaft.

A worm gear 44 is fixed to the central part of the drum shaft 38 within a gear housing 46 and said worm wheel is engaged by a worm 48 fixed to a longitudinally extending operating shaft 50, the rear end of which carries a bevel gear 52 within a gear housing 54.

Near the rear end of the frame 10 is a drive shaft 56 which is journaled in bearings 58 carried by the frame. The shaft 56 extends within the gear housing 54 and carries a pair of loosely mounted opposed bevel gears 60 and 62 which are in mesh with the bevel gear 52 of the operating shaft 50.

The driving shaft 56 has a sprocket wheel 64 fixed to one end and said sprocket wheel is engaged by a sprocket chain 66 which also engages a sprocket wheel 68 fixed for rotation with one of the ground wheels such as 14. By means of this sprocket connection the driving shaft 56 is caused to rotate as the machine advances.

Each of the loose bevel gears 60 and 62 is formed on its inner face with a clutch member 70 and a coacting double faced clutch member 71 is splined to the driving shaft 56 between said bevel gears. The clutch member 52 is adapted to be moved longitudinally of the shaft 56 by means of a lever 72 in such manner as to occupy a neutral position between the bevel gears 60 and 62 or to engage the clutch member 70 of either one or the other of said bevel gears. By this means the operating shaft 50, through its bevel gear 52, may be caused to rotate selectively in either direction so as to turn the drum shaft 38 and the drums 40 thereon through the instrumentalities of the worm 48 and the worm wheel 44.

A pair of cables designated by the numerals 74 and 76 are fixed respectively to and adapted to be wound on the drums 40 and 42 and said cables are extended over the direction pulleys 34 and 36 respectively and attached at their forward ends to the upper forward portion of the scraper pan 22.

It will be obvious from the foregoing description that I have provided a positive means for raising and lowering the scraper pan 22 by means of clutch controlled bevel gear mechanism operating through the worm gear mechanism for turning the drums 40 and 42 selectively in opposite directions.

The clutch lever 72 is arranged in substantially horizontal position and is pivoted between its ends at the point 78 on the rear wall of the gear housing 60.

A pair of control cables 80 and 82 are attached to the rear end of the clutch lever 72 and said control cables are extended laterally in opposite directions and around direction pulleys 84 and 86. The control cables then extend forwardly and upwardly over direction pulleys 88 and 90 suspended from the central part of the upright frame 32 and thence forwardly. The forward ends of the control cables 80 and 82 may be located adjacent the driver's seat on the tractor, whereby the position of the clutch lever is under the control of the operator of the tractor.

The rear gate 28 of the scraper pan is normally held in closed position by means of a pair of latches 92. Each of the latches 92 is pivoted between its ends on a bracket 94 carried by the rear part of one of the side walls of the scraper pan and has at its rear end a hooked portion adapted to be yieldingly held in engagement with the gate 28 by means of a spring 96 carried by the pan for engagement with the forward end of the latch member.

Figures 4, 5:
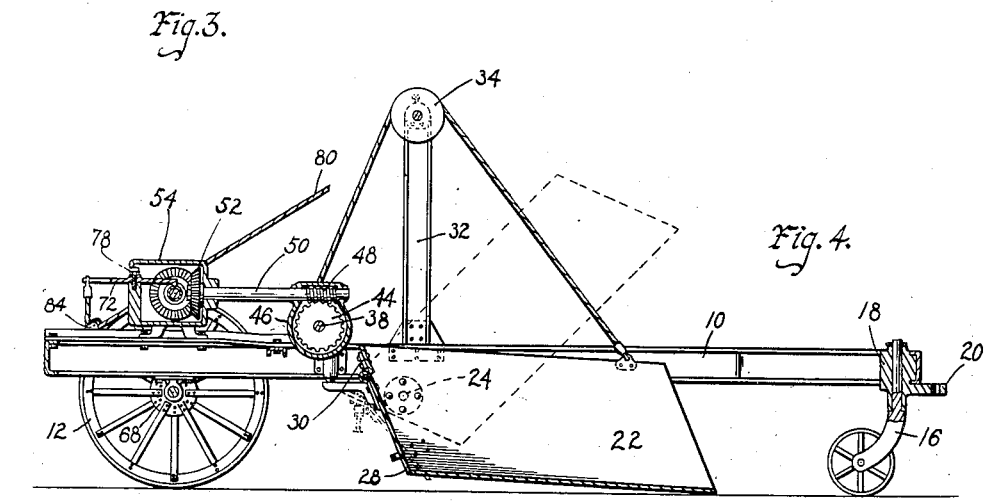
Figure 4 is a longitudinal section on the line 4—4 of Figure 1.
Figure 5 is a longitudinal section through the rear portion of the scraper pan illustrating particularly the cushioned means for automatically closing the hinged rear gate.

In practical use the wheeled scraper is drawn in trailing relation to a tractor with the scraper pan 22 in its lowered position as illustrated in Figures 2 and 4, in which position the scraper pan is adapted to receive earth or the like and to be filled by the forward advance of the machine. It is to be understood that during the filling operation the clutch lever 72 is arranged in its central or neutral position.

When the scraper pan has accumulated a load, the operator will apply draft to one of the control cables, such as 80, to oscillate the lever 72 and cause the clutch member 71 to engage the clutch element 70 of one of the loose bevel gears such as 62. Thereupon a further advance of the machine will cause the operating shaft 50 to be rotated, thus rotating the drum shaft 38 and drums for lifting the forward end of the scraper pan by winding the cables 74 and 76 on the drums.

It will be noted that the rear end of the scraper pan 72 slopes forwardly so that its rear corner begins to move upwardly through an arc as soon as the lifting operation commences. This causes the rear end of the scraper pan to rapidly clear the ground so that it will not be apt to encounter any obstructions after the lifting operation commences.

It will be obvious that the operator may cause the lifting movement of the scraper pan 22 to terminate at any desired point by applying draft to the other control cable 82, to move the clutch lever 72 back to neutral position.

It is desirable to provide a means for automatically throwing the lifting elements out of gear when the scraper pan 22 has reached a certain point in its upward travel, in order that no injury may occur to the mechanism because of failure of the operator to move the clutch lever 72 to neutral position at the proper time.

Any desired means may be employed for this purpose, but I have here shown a safety cable 98 fixed at one end to the drum shaft 38 and having a portion adapted to be wound on said drum shaft as said shaft rotates during the lifting operation. The safety cable 98 is extended upwardly over a direction pulley 100 carried by the upright frame 32 and has its opposite end attached to the control cable 82. The length of the safety cable 98 and the location of its attachment to the control cable 82 are such that when the scraper pan 22 has reached a certain point in its upward travel, a sufficient amount of the safety cable 98 will have been wound on the drum shaft 38 to cause a draft on the control cable 82 whereby the clutch lever 72 will be moved automatically to its neutral position.

I have also provided a means whereby the scraper pan 22 may be relieved of its contents by automatically opening the rear gate 28 when the pan has reached a certain elevation.

For this purpose dumping arms 102 are provided, one of which arms may be adjustably clamped on a part of the frame such as a bearing element for each of the trunnions 24 by means of a clamping device 104 shown in Figure 2. The clamping device permits the arms 102 to be adjusted to the desired position for operation at a selected point of elevation of the scraper pan.

At its free end each dumping arm 102 carries a cam 106 which projects inwardly toward the adjacent wall of the pan 22 and is adapted to be engaged by the forward end of one of the spring latches 92 at a certain point. When this engagement occurs, the latch 92 is released as indicated in Figure 6, so that the weight of the contents of the scraper pan against the rear gate 28 will cause said gate to swing to open position for dumping.

I have also provided an adjustable stop which may be employed at times for limiting the degree of opening movement of the rear gate 28.

To accomplish this I mount on the upper part of the gate 28 a bracket 108 which has a portion extending upwardly and rearwardly and terminating in a tapped seat 110 in which an adjusting screw 112 is mounted.

Figure 8:
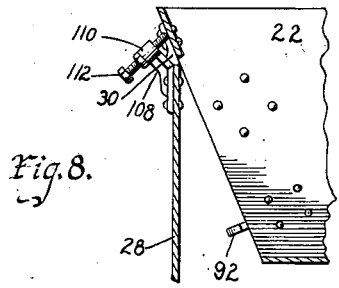
Figure 8 is a similar view showing the controlling means adjusted so as to permit only a partial opening of the gate.

The inner end of the adjusting screw 112 is directed toward the upper rear part of the scraper pan 22 and may engage the same at times to limit the degree of opening movement of the gate as indicated particularly in Figure 8.

Figure 7:
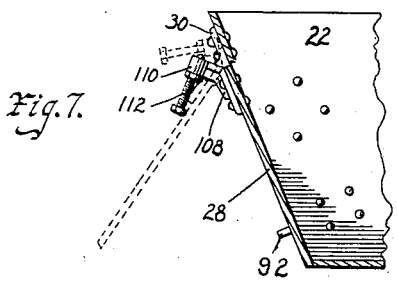
Figure 7 is a vertical section through the rear portion of the scraper pan illustrating particularly the adjustable means for controlling the degree of opening of the hinged rear gate which is shown in this view adjusted to the position for permitting a complete opening.

Thus, I provide means whereby the contents of the scraper pan may be distributed or spread upon the ground as the machine advances, because of the restricted opening of the gate. When the adjusting screw 112 is withdrawn or moved outwardly in the seat 110 as shown in Figure 7, the gate may open to a wider position for dumping the contents of the pan in one spot.

When the scraper pan has been dumped and the machine has been returned to the place for receiving another load, the pan may be moved to filling position by a further draft on the control cable 82 which will cause the clutch lever 72 to be shifted for operative engagement of the clutch member 71 with the other bevel gear such as 60. A further advance of the machine will then cause the operating shaft 50 and drum shaft 38 to be turned in such direction as to unwind the cables 74 and 76 from the drums and permit the scraper pan to be lowered by gravity.

I have also provided a means for automatically returning the rear gate 28 to closed position as the pan 22 is returned to position for filling. This means includes a lug 114 fixed to and projecting rearwardly from the gate 28. Mounted on the main frame 10, at a point immediately behind the scraper pan, is a vertically arranged bearing 116 in which a pin 118 is mounted. The pin 118 preferably has a head or enlargement at its upper end to keep it from dropping out of the bearing and its lower end projects below said bearing and is adapted to be engaged by the lug 114. A rather stiff coil spring 120 is mounted on the pin 118 within the bearing 116 and engages a shoulder or stop 122 on said pin as well as the upper end of the bearing. The spring 120 serves as a cushioning means to permit a limited upward movement of the pin 118 when it is engaged by the lug 114.

It is obvious that the downward movement of the scraper pan 22 will ultimately cause the gate 28 to be closed by the engagement of the lug 114 with the pin 118 and the cushioning spring 120 cushions and serves to prevent injury to the parts.

This machine is sturdy and durable and efficient for the purpose of excavating and moving quantities of earth or similar materials. It will be noted that the controls are either automatic or are operable by a driver or operator located on the tractor. This eliminates the need of a workman on the scraper frame itself and thus tends to economy of operation.

The utilization of a worm driving connection for the operating shaft 50 makes it possible to hold the scraper pan and its load at any desired point without the assistance of brakes or other holding devices when the clutch members are released.

It will be noted that the arrangement is such that in case the scraper pan should encounter a serious obstruction such as a large tree root while the pan is being loaded, the operator can throw the clutch mechanism into the lowering position and reverse or back the tractor and scraper a short distance, thus forcing the pan away from the object. Thereafter the pan may be raised sufficiently so as to clear and pass over the obstruction without causing injury to any of the parts.

I claim as my invention:—

1. A wheeled scraper, comprising a wheeled frame, a scraper pan pivotally suspended in said frame, a drum shaft with drums thereon journaled in the frame, cables adapted to be wound on said drums and attached to the forward end of the scraper pan, an operating shaft journaled in the frame, worm gear driving connections between said operating shaft and the drum shaft, a driving shaft journaled transversely of the frame, sprocket gear connections for driving said driving shaft from one of the wheels of the frame, a pair of opposed bevel gears mounted loosely on said driving shaft, a bevel gear on the operating shaft meshing with said opposed bevel gears, said opposed bevel gears being formed with clutch members on their innermost faces, a coacting clutch member splined on the driving shaft between the opposed bevel gears, said clutch member being formed with clutch faces arranged for selective engagement with the clutch faces of the opposed bevel gears, whereby the driving shaft and drum shaft may be rotated in either direction during travel of the machine for raising or lowering the scraper pan, a clutch lever pivotally mounted on the frame for operating said clutch member, and a pair of control cables attached to said clutch lever and extending laterally in opposite directions, a pair of direction pulleys at opposite sides of the frame over which the respective control cables are extended, said control cables being then extended forwardly of the wheeled scraper frame to permit control of the clutch devices from a position remote from the scraper devices, said control cables being selectively operable for causing engagement of the clutch device for causing the pan to be raised or lowered.

2. A wheeled scraper, comprising a wheeled frame, a scraper pan pivotally suspended in said frame, a drum shaft with drums thereon journaled in the frame, cables adapted to be wound on said drums and attached to the forward end of the scraper pan, an operating shaft journaled in the frame, worm gear driving connections between said operating shaft and the drum shaft, a driving shaft journaled transversely of the frame, sprocket gear connections for driving said driving shaft from one of the wheels of the frame, a pair of opposed bevel gears mounted loosely on said driving shaft, a bevel gear on the operating shaft meshing with said opposed bevel gears, said opposed bevel gears being formed with clutch members on their innermost faces, a coacting clutch member splined on the driving shaft between the opposed bevel gears, said clutch member being formed with clutch faces arranged for selective engagement with the clutch faces of the opposed bevel gears, whereby the driving shaft and drum shaft may be rotated in either direction during travel of the machine for raising or lowering the scraper pan, and means for automatically moving said clutch member to inoperative position, said means including a flexible element having one end attached to the drum shaft and adapted to be wound thereon during the lifting operation, said element also being connected with the clutch member for shifting the latter to neutral position when the scraper pan has been raised to a predetermined elevation.

3. In a scraper device, a frame, a scraper pan pivoted thereon, said scraper pan being provided with a swinging gate pivoted at its upper rear end, a spring pressed latch pivoted on the scraper pan for normally holding the gate in closed position, a dumping arm carried by the frame, and a cam on said arm for engaging and releasing the latch when the pan has been raised to a pre-determined position.

4. In a scraper device, a frame, a scraper pan pivoted thereon, said scraper pan being provided with a swinging gate pivoted at its upper rear end, a spring pressed latch pivoted on the scraper pan for normally holding the gate in closed position, a dumping arm adjustably carried by the frame, and a cam on said arm for engaging and releasing the latch when the pan has been raised to a pre-determined position.

5. In a scraper device, a scraper pan pivotally mounted, a swinging gate hinged at its upper end for normally closing the rear end of said pan, a bracket fixed to the rear face of said gate and formed with a tapped seat, and a threaded stop member adjustably mounted in said seat and adapted to engage the upper part of the pan for adjustably controlling the extent of opening of the gate.

6. In a scraper device, a frame, a scraper pan pivotally mounted thereon, a swinging gate hinged at its upper end for normally closing the rear end of said pan, a slide bearing carried by the frame at the rear of said pan, and a spring pressed pin mounted in said bearing, said gate having a part arranged for engagement with said pin as the pan is lowered, for automatically closing said gate.

Des Moines, Iowa, December 31, 1929.

ELMER E. DORAN.